United States Patent
Word

(10) Patent No.: US 10,755,318 B1
(45) Date of Patent: Aug. 25, 2020

(54) DYNAMIC GENERATION OF CONTENT

(71) Applicant: Amazon Technologies, Inc., Seattle, WA (US)

(72) Inventor: Jonathan Brian Word, Seattle, WA (US)

(73) Assignee: Amazon Technologies, Inc., Reno, NV (US)

( * ) Notice: Subject to any disclaimer, the term of this patent is extended or adjusted under 35 U.S.C. 154(b) by 299 days.

(21) Appl. No.: 15/804,271

(22) Filed: Nov. 6, 2017

Related U.S. Application Data

(62) Division of application No. 14/297,289, filed on Jun. 5, 2014, now Pat. No. 9,852,451.

(51) Int. Cl.
  *G06Q 30/00* (2012.01)
  *G06Q 30/02* (2012.01)
  *G06Q 50/00* (2012.01)

(52) U.S. Cl.
  CPC ......... *G06Q 30/0269* (2013.01); *G06Q 50/01* (2013.01)

(58) Field of Classification Search
  None
  See application file for complete search history.

(56) References Cited

U.S. PATENT DOCUMENTS

| | | | | |
|---|---|---|---|---|
| 7,281,018 B1* | 10/2007 | Begun | ............... | G06F 40/117 |
| 2004/0039594 A1* | 2/2004 | Narasimhan | ............ | G06F 21/10 |
| | | | | 705/1.1 |
| 2004/0199923 A1 | 10/2004 | Russek et al. | | |
| 2006/0101341 A1* | 5/2006 | Kelly | ............... | G06F 3/04812 |
| | | | | 715/738 |
| 2007/0255697 A1* | 11/2007 | Seeman | ............ | G06F 16/2465 |
| 2008/0065974 A1* | 3/2008 | Campbell | ............ | G06Q 10/107 |
| | | | | 715/200 |
| 2008/0077580 A1 | 3/2008 | Ozveren et al. | | |
| 2008/0098420 A1* | 4/2008 | Khivesara | ............ | G06Q 30/02 |
| | | | | 725/32 |
| 2008/0201731 A1 | 8/2008 | Howcroft | | |
| 2008/0275904 A1* | 11/2008 | Breebaart | ............ | G06F 16/634 |
| 2010/0055655 A1* | 3/2010 | Ashman, Jr. | ............ | G09B 7/02 |
| | | | | 434/236 |
| 2010/0077215 A1* | 3/2010 | Placin | ............... | G06Q 30/06 |
| | | | | 713/171 |
| 2010/0083163 A1* | 4/2010 | Maghoul | ............... | G06F 1/1626 |
| | | | | 715/781 |

(Continued)

OTHER PUBLICATIONS

STIC EIC 3600 Search Report dated Jan. 7, 2019 (Year: 2019).*

(Continued)

*Primary Examiner* — Matthew T Sittner
(74) *Attorney, Agent, or Firm* — Kilpatrick Townsend & Stockton LLP

(57) ABSTRACT

Techniques for providing user specific content may be provided. In some examples, a method may be provided for receiving a request for content that is configured to be revised with user content associated with a user. In some examples, a user profile that indicates a perceptual orientation of the user is determined based at least in part on user-initiated activity. A data object associated with the user's perceptual orientation may be generated based at least in part on the determined user profile. Further, in some examples, the content may be revised to at least include the data object and provided.

13 Claims, 10 Drawing Sheets

(56) References Cited

U.S. PATENT DOCUMENTS

| | | | |
|---|---|---|---|
| 2011/0258049 A1 | 10/2011 | Ramer et al. | |
| 2012/0047008 A1* | 2/2012 | Alhadeff | G06Q 30/0214 705/14.16 |
| 2012/0218285 A1* | 8/2012 | Crane | A61B 5/4023 345/589 |
| 2012/0233037 A1* | 9/2012 | Lamoureux | G06Q 50/04 705/27.2 |
| 2012/0249535 A1* | 10/2012 | Castineiras | G06T 19/00 345/419 |
| 2013/0006703 A1* | 1/2013 | Hines | G06Q 30/02 705/7.29 |
| 2013/0013448 A1* | 1/2013 | Bradley | G06Q 30/06 705/26.7 |
| 2013/0036159 A1* | 2/2013 | Jaye | G06F 21/6254 709/203 |
| 2013/0054355 A1 | 2/2013 | Raza et al. | |
| 2013/0238612 A1* | 9/2013 | Tsongas | G06F 16/9535 707/723 |
| 2013/0305272 A1* | 11/2013 | Fullett | H04N 21/812 725/14 |
| 2014/0013196 A1 | 1/2014 | White et al. | |
| 2014/0019564 A1* | 1/2014 | Ye | H04L 51/066 709/206 |
| 2014/0046801 A1 | 2/2014 | Proudfoot et al. | |
| 2014/0100030 A1* | 4/2014 | Burke | G07F 17/3204 463/31 |
| 2014/0145934 A1* | 5/2014 | Hayashida | G06K 9/00335 345/156 |
| 2014/0195901 A1* | 7/2014 | DeBlois | G06F 40/109 715/256 |
| 2014/0214558 A1* | 7/2014 | Varghese | G06Q 30/0277 705/14.73 |
| 2014/0229827 A1* | 8/2014 | Castro | G06F 40/186 715/273 |
| 2014/0248943 A1* | 9/2014 | Burgin | A63F 13/69 463/29 |
| 2014/0278786 A1* | 9/2014 | Liu-Qiu-Yan | G06Q 30/0251 705/7.32 |
| 2014/0359649 A1* | 12/2014 | Cronk | H04N 21/25866 725/14 |
| 2015/0088622 A1* | 3/2015 | Ganschow | G06Q 30/0252 705/14.5 |
| 2015/0169535 A1* | 6/2015 | Pusateri | G06F 3/0481 715/202 |
| 2015/0178282 A1* | 6/2015 | Gorur | G06F 16/9535 707/748 |
| 2015/0339588 A1* | 11/2015 | Cardonha | G06F 3/016 706/11 |
| 2016/0117722 A1* | 4/2016 | Garcia | G06Q 50/10 705/14.49 |

OTHER PUBLICATIONS

U.S. Appl. No. 13/973,839, U.S. Patent Application, filed Aug. 22, 2013, Titled: Managing Orientation-Specific Content.

U.S. Appl. No. 14/297,289, U.S. Patent Application, filed Jun. 5, 2014, Titled: Dynamic Generation of Content.

U.S. Appl. No. 14/297,289, "Final Office Action", dated Apr. 13, 2017, 19 pages.

U.S. Appl. No. 14/297,289, "Non-Final Office Action", dated Dec. 7, 2016, 23 pages.

U.S. Appl. No. 14/297,289, "Notice of Allowance", dated Sep. 5, 2017, 19 pages.

* cited by examiner

DYNAMIC GENERATION OF CONTENT

CROSS REFERENCE TO RELATED APPLICATIONS

This application is a Division of U.S. patent application Ser. No. 14/297,289, filed Jun. 5, 2014, entitled "DYNAMIC GENERATION OF CONTENT," the content of which is herein incorporated by reference in its entirety.

BACKGROUND

Many people spend their time on the internet joining and participating in social networking sites. Social networking sites provide the opportunity for people to share information about their interests, beliefs, preferences, and personal details such as birthdates or contact information. The casual browser of the internet or a consumer who may participate in social networking sites may also be presented with online advertisements. Recommended items or online advertisements can be provided to the consumer based at least in part on a number of factors. For example, some systems attempt to present advertisements to the consumer based solely on the consumer's recent browsing history. However, the way in which the recommended items or advertisements are presented to the casual browser of the internet may play a large part in whether the user will respond to the advertisement or merely view the advertisements as a nuisance. Online advertisements can be presented in such a way that while the information included in the advertisement would be interesting to the consumer it may be completely ignored because of the way it is presented.

BRIEF DESCRIPTION OF THE DRAWINGS

Various embodiments in accordance with the present disclosure will be described with reference to the drawings, in which.

DETAILED DESCRIPTION

Figure 1:
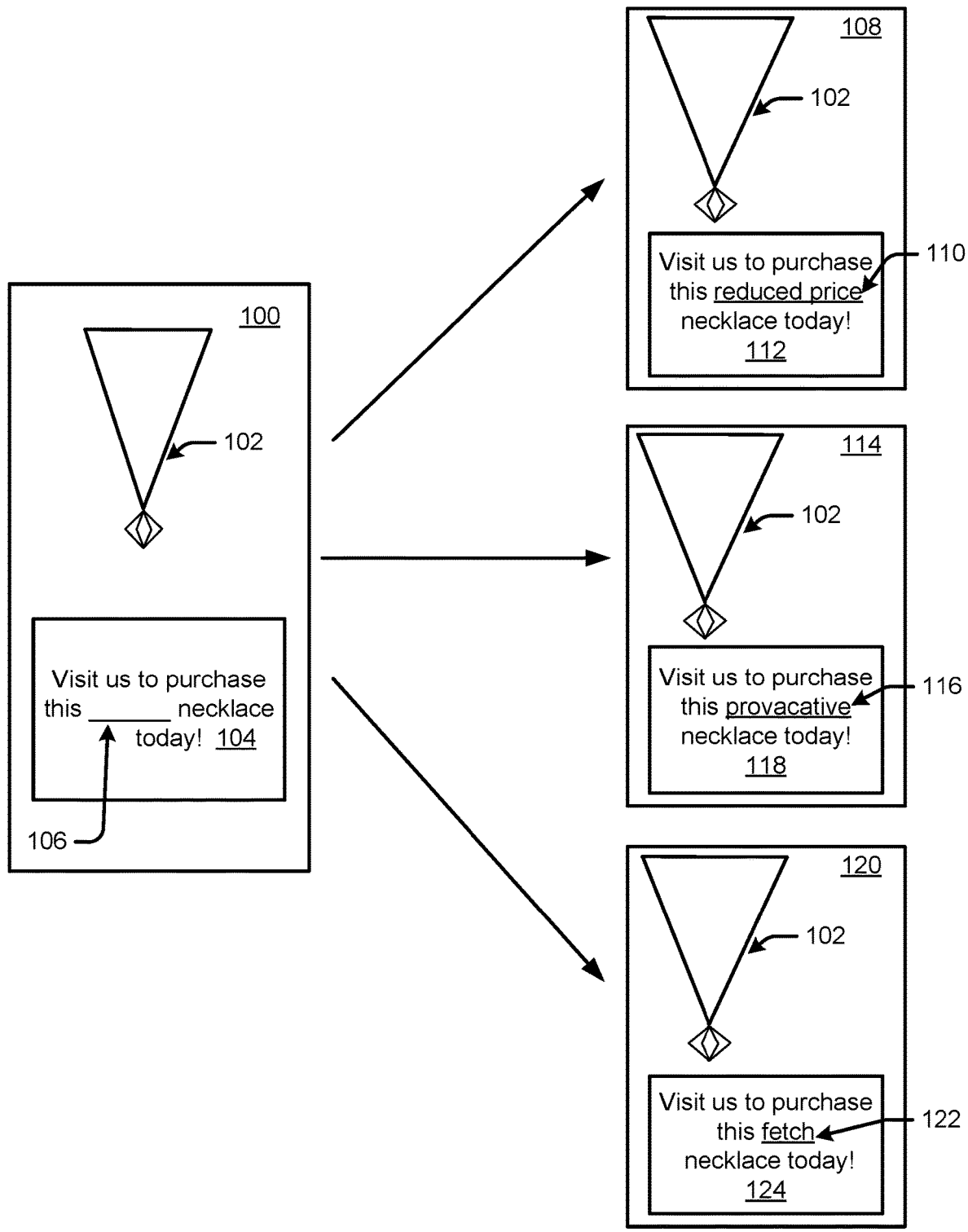
FIG. 1 illustrates several examples of user specific content that may be provided to a user in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Techniques described and suggested herein include systems, methods, and computer-readable medium for providing user specific content to a user. In some examples, the user specific content may be provided and/or determined based at least in part on analyzing social network posts and/or other user-initiated activity data to determine a perceptual orientation of a user (e.g., if a user is visually oriented or textually oriented, if a user is pessimistic or optimistic). In some examples, the user specific content may be provided and/or determined based at least in part on analyzing social network posts and/or other user-initiated activity data. In some examples, user-initiated activity may be from an electronic marketplace source and may also be used to determine a user's perceptual orientation. In other examples, user-initiated activity includes activity performed on any computer device or application, such as a mobile computing device or graphical user interface associated with an application. A profile may then be created for a user based at least in part on the previously determined perceptual orientation. Further, advertisements, item recommendations, and/or other content in an electronic marketplace may be updated or revised based at least in part on the user's perceptual orientation. It should be noted that a determination of a user's perceptual orientation may include identifying a location on one or more perceptual spectrums associated with the user. In some examples, the perceptual spectrums may define a range of one or more perceptual orientation types including, but not limited to, visually oriented, textually oriented, technically or non-technically oriented, pessimistic or optimistic, or any other orientation type.

In other examples, user-initiated activity may provide further insight into a user's perception orientation. For example, if a user is textually oriented he/she may also use the same adjectives or grammar style consistently. This may be a useful piece of data to utilize when determining a user's profile. In accordance with at least one embodiment, the user-initiated activity may be parsed to determine or learn phrases or objects utilized by the user with frequency. In an example, the user's profile may indicate not only their perceptual orientation with respect to a variety of perceptual spectrums but also a set of frequently used phrases or objects and their associated contextual meaning. For example, a user may utilize the phrase "fetch" as a positive adjective for an item or product. As another example, a user may frequently post tropical scene pictures from a particular geographic location. This information can be utilized to generate content particular to the user. In some examples, other spectrums may define a range of orientation types including technical levels of the user, and may also be based at least in part on user-initiated web activity. A technically oriented user may be a user who places more importance on specific facts about an item above the aesthetics of an item. For example, a technically oriented person would find the hardware details of a new laptop, such as the amount of memory and processor speed, to be more informative than how aesthetically pleasing the laptop looks when trying to determine whether to purchase said laptop.

In at least one embodiment, the user's profile may be utilized to determine or generate user content associated with a particular user. The user content may then be utilized to update or revise content or a template from a content creator. In accordance with at least one embodiment, an advertisement may be generated based at least in part on the revised content or the revised template. For example, a content creator may generate an advertisement for presentation to a user but leave certain portions of the advertisement incomplete. In accordance with at least one embodiment, a content creator may generate or provide content that is configured to be updated with user content associated with the user. In accordance with at least one embodiment, metadata associated with user-initiated activity data may be utilized to determine or generate the user content that will be included in the updated or revised content. As described herein, "content" or "template" includes content with text, image, audio, or video attributes that may be modified or an interactive advertisement. An interactive advertisement can include content that is configured to interact with the graphical environment in which it is presented in. An example of an interactive advertisement is an advertisement that can enlarge in size and begins playing audio when a user scrolls over the advertisement. As described herein, "user content" or "content associated with a user" includes at least an alpha numeric string, video data, audio data, image data, or any data object suitable for incorporation into content or a template. In accordance with at least one embodiment, a service associated with a user specific content feature may provide the updated or revised content to the content creator for selection or presentation to a user.

In a non-limiting example, the service may obtain user-initiated activity data of a particular user. For example, a user's social networking service may be identified and analyzed to obtain the user-initiated activity data. The user-initiated activity data may indicate a perceptual orientation of a user. The service may receive a request to update content provided by a content creator where the content is configured to be revised with user content associated with the user. For example, the service may receive an advertisement from a content creator that includes one or more missing phrases where the one or more missing phrases will be provided by the service. The service may generate one or more phrases, which may be tailored to the user, based at least in part on the user-initiated activity data and/or the user profile of the user. In accordance with at least one embodiment, the service may provide the content that has been revised to at least include the generated one or more phrases to the content creator for selection or presentation to the user.

In at least one embodiment, the determination of a user's profile which may indicate a perceptual orientation includes receiving or obtaining data from a social networking source and/or from a data store associated with an electronic marketplace. The social networking source may include any social networking source known in the art that can be associated with the user. Further, the data from the social networking source can include metrics or other information indicating relative frequencies associated with posting web content (e.g., whether the user posts more pictures, videos, or text), particular phrases or data objects provided by the user, or any metrics which can be gathered from the social networking source. In some embodiments, the user may opt-in or grant access of their social network data source to an electronic marketplace or any website that is associated with an electronic marketplaces advertisement network. In some embodiments, the user may opt-out of any service that collects their social network data source information or publicly available data that can be obtained through public networks. The data from the electronic marketplace can include metrics such as how long a user's mouse hovers over images in an item detail page, how long a user spends on an item detail page before purchase, whether the user scrolls to text or technology specifications of an item, the user's clickstream data such as whether the user clicks or selects an advertisement or recommended item, or other metrics which may be tracked and/or gathered from an electronic marketplace with which the user is associated or through which the user is browsing. It should be noted that clickstream data can be any data gathered from a user's web browsing activity whether it occurs on an electronic marketplace or not. In some embodiments, data points can be gathered from a user's activity on a website associated with an advertising network that is associated with an electronic marketplace, either directly from the associated website or from a data store maintained by the associated website. For example, if a user responds positively to advertisements that contain mostly visual elements, a machine learning algorithm can incorporate this additional data point into the determination of identifying a location on one or more perceptual spectrums associated with the user.

In some examples, if the user has not granted access to or shared information about their associated social network, publicly available data that can be obtained through public networks can be utilized to determine a user profile. In still other examples, any publicly available data can be utilized to determine a user profile. Additionally, both publicly available data and social network data may be used. In at least one embodiment, the determination of a user's profile may include utilizing the received and/or obtained data, as described above, to teach a machine learning algorithm to create a user profile. The user profile may include information which indicates a location of the user along a perceptual orientation spectrum according to the received and/or obtained data. The location of the user in the perceptual orientation spectrum may define the user's perceptual orientation, such as whether the user is at least visually/textually oriented or familiar/unfamiliar with an item. The user profile may also dynamically change based at least in part on the received and/or obtained data as described above.

In some embodiments a machine learning algorithm can be utilized to define and assign hard bound regions for each perceptual orientation spectrum in which the user is identified. The definition and assignment of regions for each perceptual orientation spectrum results in a dynamic shape for each user representing their perceptual orientation in a plurality of spectrums simultaneously. In other embodiments, the hard bound regions of each perceptual spectrum can dynamically change or shift as the data utilized by the machine learning algorithm is updated. In some embodiments feedback information provided by the user can be utilized by the machine learning algorithm to update the user's location in a perceptual spectrum. In an embodiment, feedback information can include any metrics, as described above, or information obtained from a user in response to being presented with updated content. For example, metrics and/or data may be obtained based at least in part on the user's positive or negative response to updated or revised content that is presented to the user. A positive reaction can include metrics which indicate the user has clicked on, interacted with, or scrolled over an advertisement provided to them. These metrics can be used to expand or shrink the defined hard boundaries for a user in each perceptual spectrum over time by the machine learning algorithm. In some examples, the user may be presented with updated content or an updated advertisement that does not correspond to a best match or fit based at least in part on their location within the perceptual spectrum profile. For example, in some embodiments, content from a region that is not the optimal region for the user within a particular perceptual spectrum may be selected and presented to the user in order to gather additional metrics and/or data. By presenting the user with content from sub-optimal regions, the machine learning algorithm can gather additional data to help determine whether a user's preferences or perceptual orientation has changed over time. It should be noted that different content creators may result in unique assignments of a region along a perceptual spectrum for each user. In some embodiments, the machine learning algorithm may utilize a user's relative location in a perceptual spectrum to determine a phrase or data object that can be utilized to update or revise content which can be selected and presented to the user.

In some embodiments, a plurality of users with similar user profiles will cluster within a region of a perceptual spectrum. In accordance with at least one embodiment, the machine learning algorithm can compare or match a particular user's profile, which indicates the user's perceptual orientation, to the cluster of similarly oriented user profile data points and determine a phrase or data object that should be utilized to revise or update content that will be selected and presented to the user.

Examples of machine learning algorithms such as support vector machine learning, online learning, unsupervised learning, or supervised learning can be utilized in some embodiments to determine the regions for perceptual spectrums and user locations within the identified spectrums for a particular user. In some embodiments, as few as one data source such as the social networking source may be utilized by the machine learning algorithm to define the regions which characterize the user's perceptual orientation. In other embodiments, more than the above detailed social networking and electronic marketplace data sources may be utilized by the machine learning algorithm to determine a user's profile that indicates the user's perceptual orientation. In still other embodiments, the machine learning algorithm may utilize as many data sources or metrics that are available in order to determine a user profile and assign regions in a perceptual spectrum to a particular user. While a machine learning algorithm is described it should be understood that the described system and methods herein can be performed according to any suitable algorithm.

In at least one embodiment, content may be updated or revised by a data object generated by the service where the data object is based at least in part on the user's profile or user-initiated activity. In some embodiments, the computer system of a user may be configured to utilize a browser which can display an updated advertisement or piece of content to the user.

In accordance with at least one embodiment, the service may also utilize information corresponding to the environment in which the revised content will eventually be presented to a user to determine the modifications or inclusion of particular data objects to generate the revised content. For example, a user may be presented with different permutations of revised content depending on whether the request for content originates from a web browser versus a mobile device or user interface. In still other embodiments, a user or consumer of an electronic marketplace may be presented with a changed and/or updated item detail page according to the user's determined profile. In other words, a standard item detail page may be changed and/or updated to a customized item detail page for the particular user based at least in part on the user's profile. It should be noted that the machine learning algorithm may continue to learn based at least in part on how the user responds to the updated advertisements or item detail pages. The clickstream data associated with how the user responds to the presented candidate content may also be used in the determination of the user's profile and the assignment of regions for perceptual spectrums. Additionally, in other examples, any type of web content including, but not limited to, other web pages (e.g., not necessarily related to items or advertisements), videos, images, etc., may be customized, updated, modified, and/or otherwise changed to fit a user's profile, and in some examples, may be subsequently provided to the user based at least in part on this profile.

The machine learning algorithm may, in some examples, dynamically shift the regions in a perceptual spectrum according to the clickstream data of the user and/or any updated or changed data from the previously described sources. Thus, a user whose profile identifies them within a particular location in a visual orientation spectrum may be shifted to a location in the spectrum which identifies them as a mix of visually and textually oriented based at least in part on the updated data. In some embodiments, if a user lacks any social networking source data or electronic marketplace data a profile may still be created and applied to the user based at least in part on a plurality of users that are located within a geographic range of the user. For example, a user profile can be selected from aggregated user profile data associated with the plurality of users of an electronic marketplace that are located within a certain geographic range of the user. In other examples, a number of other metrics gathered or obtained from a user may be utilized to determine an aggregate user profile. In accordance with at least one embodiment, the aggregate user profile is determined based on metrics obtained from the plurality of users activity with specific content or a particular content creator. Such examples include the machine Internet Protocol (IP) address of the user's computer device, which web page was recently visited before visiting an electronic marketplace, and information regarding the computer's hardware configuration such as device type, manufacturer, operating system, and the browser utilized by the user. In still other examples if the user is interacting on a mobile device data metrics may be gathered by observing the user's behavior on mobile device. The metrics utilized for one user may also be gathered from a plurality of users to determine an aggregate profile. For example, if a plurality of users are interacting on a mobile device and have a number of visually oriented applications in common with a particular user, we may assign the particular user the same perceptual orientation profile as the plurality of users. In some examples, a user's profile may be stored within an identifier (e.g., a cookie, a tag, or other identification) such that the user profile may be shared with other applications and/or service providers. For example, the identifier may indicate the user's profile and may be provided to a computer system or browser of the user. The sharing of this information allows other websites who are associated with an advertising network (e.g., associated with the electronic marketplace) to customize the display of their products to the user based at least in part on the user's determined profile.

FIG. 1 illustrates several examples of user specific content that may be provided to a user in accordance with at least one embodiment. In accordance with at least one embodiment, a request to revise content may be received from a content creator. For example, a content creator may provide an advertisement, such as advertisement 100, to the service for revision based at least in part on a user's profile. The provided advertisement 100 may include, in the current example, an image of a necklace 102, associated text 104 urging the user to order the necklace 102, and a missing portion or placeholder 106. In accordance with at least one embodiment, the service may determine a user profile based at least in part on the user-initiated activity data that includes information indicating a perceptual orientation of the user. The service may generate a data object or phrase based at least in part on the user profile information. In accordance with at least one embodiment, the data object or phrase may be utilized to update or revise the advertisement 100 by including the data object or phrase in place of the missing portion or placeholder 106.

FIG. 1 includes three variations, 108, 114, and 120, of updated or revised advertisement 100. The advertisement 100 may be updated or revised based at least in part on a user's profile information. Updated advertisement 108 includes the necklace image 102 but the associated text 112 has been updated with a phrase determined based at least in part on the user profile 110. For example, the user profile determined for a user may indicate that their location on a perceptual spectrum of risky/safe consumer places them as a safe consumer oriented person. The service may utilize the user-initiated activity of the user on a social networking service to aid in determining their user profile and the generation of the data object or phrase 110 that can be utilized to update or revise the advertisement 108 to appeal to a safe consumer oriented person.

In accordance with at least one embodiment, the service may utilize the user profile information or user initiated activity to determine whether a user is more receptive of an item as being either a safe item or an exotic item. For example, the service may identify a user's location in a safe or exotic spectrum for a particular item based at least in part on a machine learning algorithm utilizing information obtained from the user's profile. Updated advertisement 114 includes the necklace image 102 but the associated text 118 has been updated with a phrase 116 determined based at least in part on the user profile. The updated advertisement 114 includes the phrase 116, determined by the service that would appeal to a user who views the necklace as an exotic item.

In accordance with at least one embodiment, the service may also utilize the user's profile information to identify a data object or phrase that the user has created on their own and used with increased frequency in their associated social networking service. The service may parse metadata associated with the user-initiated activity to identify new phrases or objects to determine the appeal to the user and their meaning from the context that they are used in. For example, the user may utilize the phrase "fetch" several times in their social networking service as an adjective in a positive statement. In accordance with at least one embodiment, the service may provide updated advertisement 120 including the "fetch" phrase 122 based at least in part on the user-initiated activity associated with the user. The service may provide updated advertisement 120 with the necklace image 102 and its updated associated text 124 with the determined phrase 122 based at least in part on the user-initiated activity of the user. In accordance with at least one embodiment, the context of a phrase used frequently by a user may aid the service in determining which phrase to replace in a received advertisement on behalf of a content creator.

Figure 2:
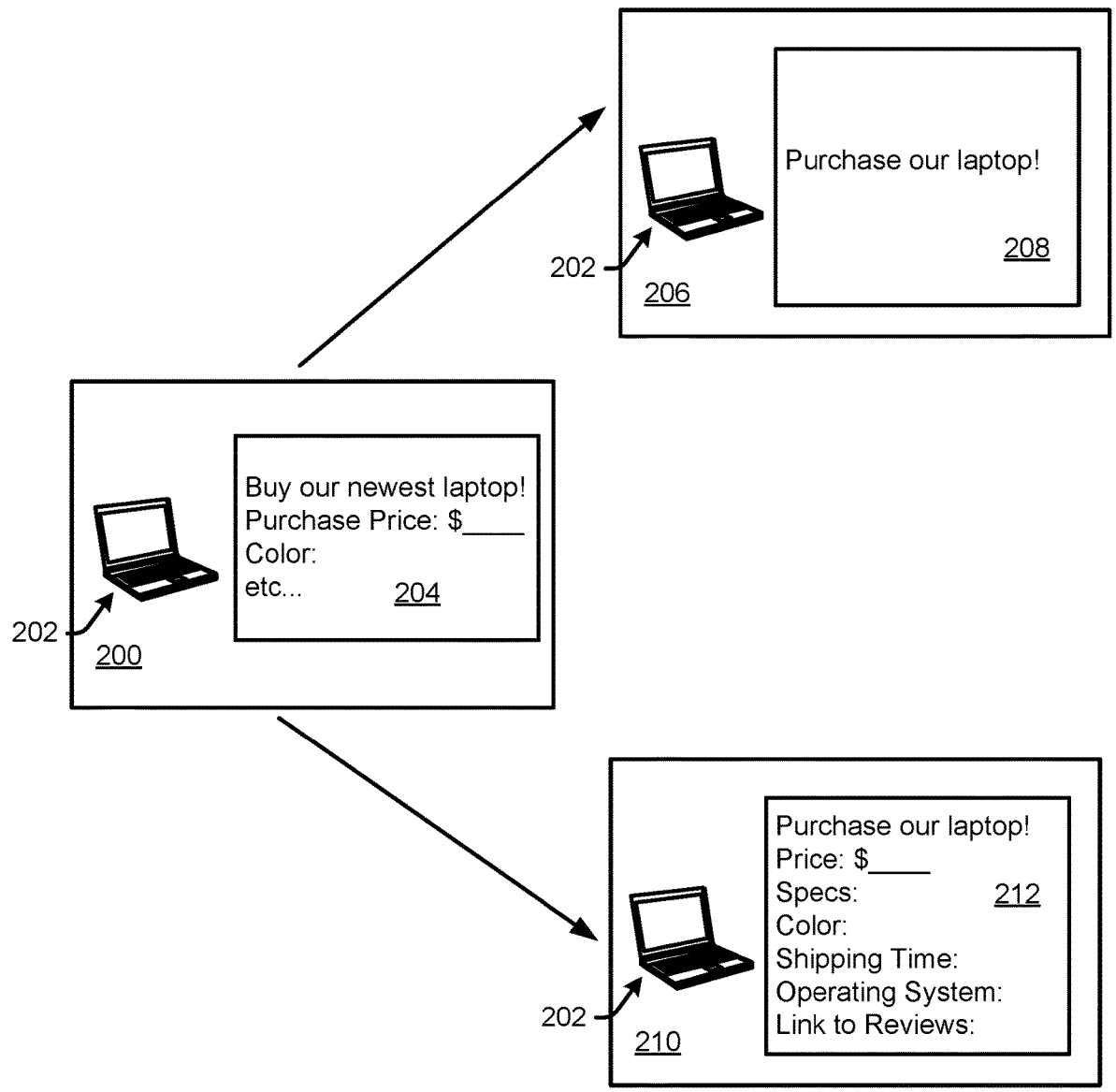
FIG. 2 illustrates several examples of user specific content that may be provided to a user in accordance with at least one embodiment.

FIG. 2 illustrates several examples of user specific content that may be provided to a user in accordance with at least one embodiment. In accordance with at least one embodiment, the service may determine a user is familiar or unfamiliar with an item based at least in part on the metadata associated with the user's initiated activity. In accordance with at least one embodiment, a machine learning algorithm can utilize the user-initiated activity or user profile to locate the user in a perceptual spectrum associated with familiarity of a particular item. FIG. 2 includes an advertisement 200 that is configured to be updated by the service. The advertisement 200 includes an image of a laptop 202 and some associated descriptive text of the item 204. In accordance with at least one embodiment, the service may, in addition to providing a phrase or object to include in content that has been updated, further modify or update the advertisement itself. For example, the service may determine based at least in part on a user's profile that the user responds well to blue text that is of a certain font size. The service may receive content configured to be updated and provide an object to update the content but also modify metadata or parameters associated with the content based at least in part on a user profile. To continue the example, in addition to the service identifying an adjective that the user would respond positively to, the service may modify the phrase, object, or content to further appeal to the particular user. In accordance with at least one embodiment, content that includes video, audio, or image data may be updated or modified by data objects generated by the service. The content creator may provide a specification or other information file that can allow the service to determine where to include the generated object to result in updated or revised content. As used herein, the phrase "specification" includes information indicating allowances or restrictions regarding any modifiable parameter of the revised content or the generated object. For example, the specification can include a range of values for the generated object's size, shape, or any other suitable parameter. The generated object may be modified based on the allowances or restrictions included in the specification and integrated into the updated content. As another example, the specification can include allowances for a parameter of an image to be included in revised content. The specification may specify that the image must include a sunset over a beach scene. The service can utilize the user's profile to generate a picture of a beach that is geographically local to the user for integration in the revised content. In an embodiment, the specification can include parameters or restrictions for a parameter of the content itself rather than for the generated object that can be modified by the service to provide updated or revised content that may appeal to a particular user. The data object generated for inclusion in the content may be determined based at least in part on user-initiated activity data and/or a user profile for a particular user, resulting in content that is specific and appeals to the particular user.

FIG. 2 includes some examples of updated advertisements 206 and 210 based at least in part on a user's profile information and/or user-initiated activity. Updated advertisement 206 includes the same laptop image 202 but the associated descriptive text 208 has had some text removed. The service may have modified the descriptive text 208 based at least in part on the user's profile and/or user-initiated activity. For example, the service may have identified that this particular user is familiar with the item, or laptop 202, and therefore additional text describing specifications for the item are not required in order to appeal to the user. In accordance with at least one embodiment, the service may update an advertisement, such as advertisement 200 to include more information relating to the item included in the advertisement. For example, updated advertisement 210 includes the same laptop image 202 but the associated text 212 has been updated by the service to include more information about the laptop 202. The service may have identified that the user is unfamiliar with the particular item based at least in part on their user profile and/or user-initiated activity and modified the associated text 212. The systems and methods described herein can update or revise content or advertisements which correlate to different regions of or a mix of any perceptual orientation spectrum for the particular user.

Figure 3:
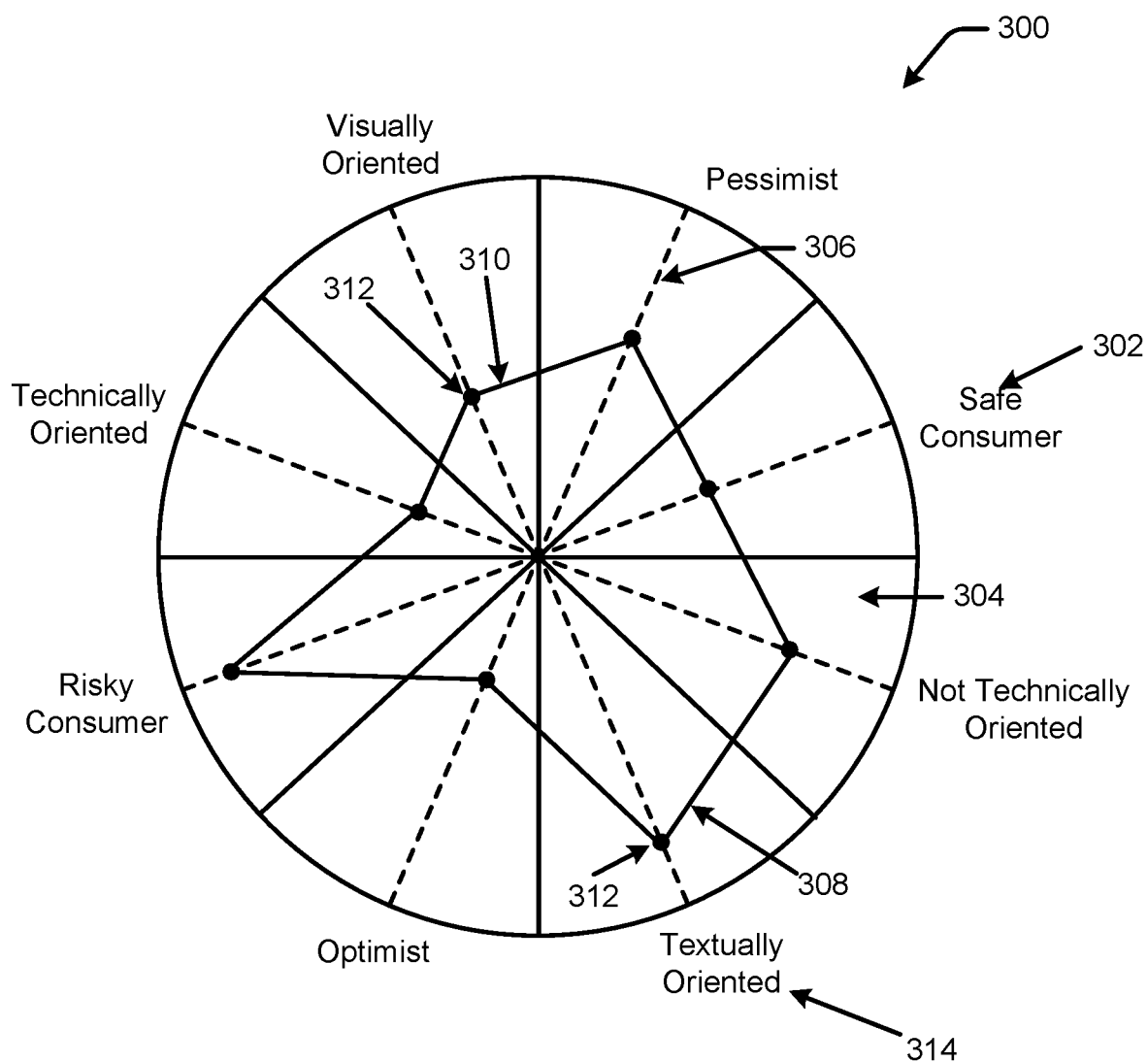
FIG. 3 illustrates an example perceptual spectrum with different areas defined by a machine learning algorithm with corresponding user data points in accordance with at least one embodiment.

FIG. 3 illustrates an example perceptual spectrum 300 with different areas defined by a machine learning algorithm with corresponding user data points in accordance with at least one embodiment. The perceptual spectrum 300 includes a plurality of perceptual orientation spectrums 302 (such as safe consumer/risky consumer). Each perceptual orientation spectrum 302 includes an associated area 304, an axis 306, and a region 308 for a particular user. The orientations described in FIG. 3 are not meant to be limiting and any orientation may also be incorporated. As described above, in some embodiments a machine learning algorithm can assign regions in a perceptual orientation spectrum 302 for a user based at least in part on user-initiated activity data. In FIG. 3, for example, a region 308 to 310, resulting in a certain shape for the particular perceptual orientation spectrum, has been defined for a user in a textually oriented or visually oriented spectrum indicating that the example user is more textually oriented than visually oriented.

As described above, the borders of the regions 308 and 310 may be shifted, may grow, and/or may shrink depending on the machine learning algorithm and the data utilized. Further, in some examples, the machine learning algorithm may utilize a user's social network data and electronic marketplace data to determine a user's profile which may include information that identifies a location within each perceptual orientation spectrum 302 and their corresponding regions, such as 308 and 310. Data points 312 within a region, such as 308 and 310, along an axis 306 identify a location and a shape for an individual user within a perceptual orientation spectrum 302 as determined by the machine learning algorithm. For example, a user whose corresponding data points 312 for regions 308 and 310 in perceptual orientation spectrum 314 is identified as being more visually oriented according to the machine learning algorithm. Thus, based at least in part on the received or obtained user data (user-initiated activity data), the machine learning algorithm may infer the perceptual orientation of a user in a perceptual spectrum and a profile can be created which can include information indicating the determined orientation. In accordance with at least one embodiment, a user profile indicating their perceptual orientations may be generated for each content creator and their associated items. In accordance with at least one embodiment, the service may provide only a portion of a user's user-initiated activity data to the machine learning algorithm to determine a user profile for a particular content creator. In an embodiment, the machine learning algorithm may be provided with all available user-initiated activity data to generate the user's profile.

In other examples, the machine learning algorithm can learn based at least in part on clickstream data associated with an electronic marketplace. For example, if a user is presented with an advertisement that contains mostly visual elements and the user responds positively by clicking on the advertisement, a data point may be captured which can be utilized by the machine learning algorithm to infer this particular user is visually oriented and thus would prefer visually oriented advertisements. In the alternative, if the user does not respond positively by not clicking or selecting the advertisement a different data point may be captured which can be utilized by the machine learning algorithm to infer the user's location along a perceptual orientation spectrum.

Figure 4:
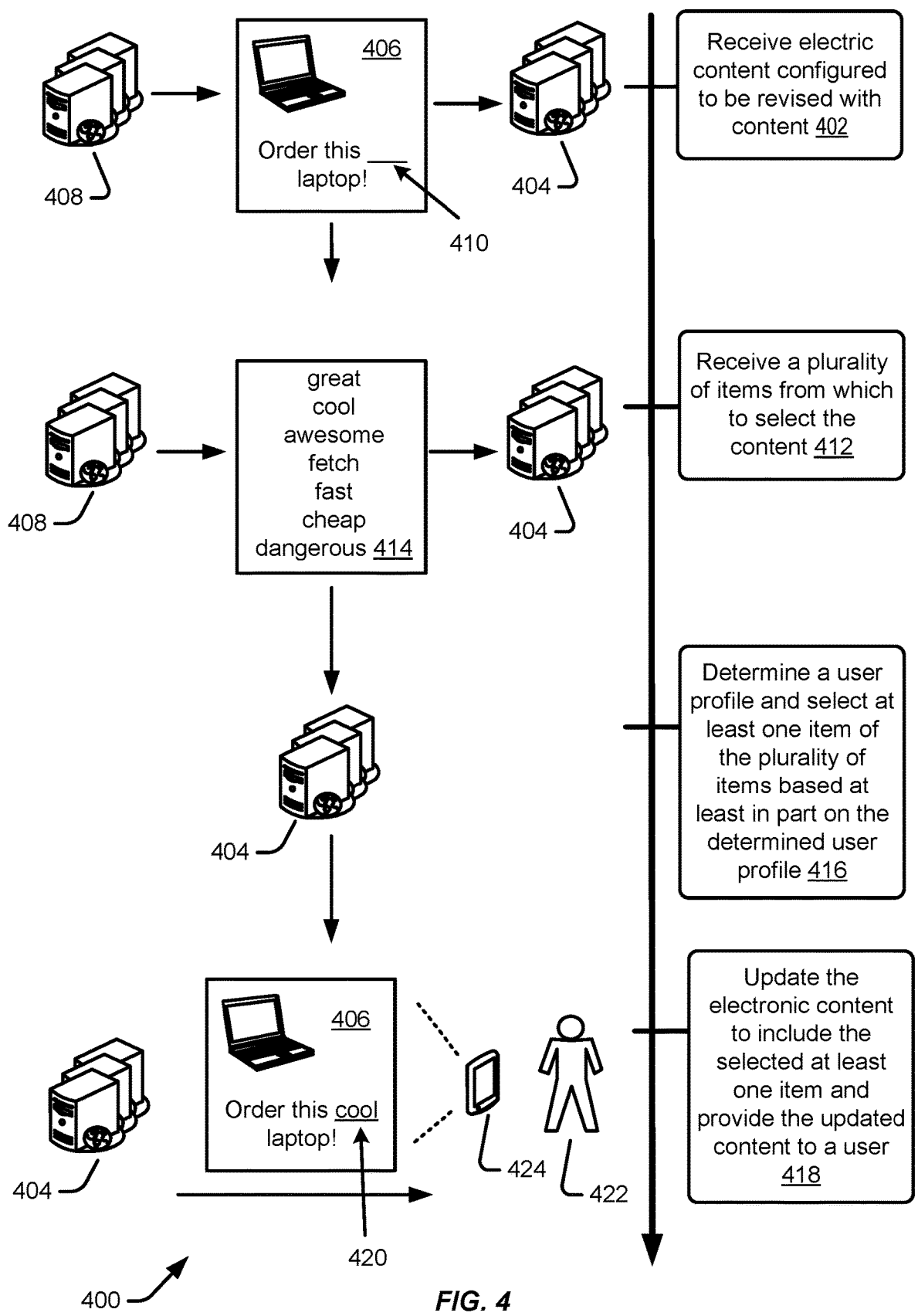
FIG. 4 illustrates a data flow for providing a user specific content feature associated with a plurality of items from which to select user content from a content provider as described herein, in accordance with at least one embodiment.

FIG. 4 illustrates a data flow for providing a user specific content feature associated with a plurality of items from which to select content associated with a user from a content provider as described herein, in accordance with at least one embodiment. The order in which the operations are described is not intended to be construed as a limitation, and any number of the described operations can be combined in any order and/or in parallel to implement the described data flow. It should be noted in the following example that vertical arrows present in FIG. 4 represent the transition from one step to the next in the method 400. In one non-limiting example, the method 400 can receive electric content configured to be revised with content associated with a user at 402. For example, one or more service computers 404, associated with a user specific content feature, can receive electric content 406 configured to be revised with content associated with a user from one or more content creator computers 408. In an example, the electric content can include a placeholder 410 for the content associated with the user that will revise the electric content.

The method 400 may receive a plurality of items from which to select the content associated with the user at 412. For example, one or more content creator computers 408 can provide a set of phrases 414 or items to the one or more service provider computers 404 to include in the updated electronic content or advertisement 406. In accordance with at least one embodiment, the content creator can provide the set of phrases 414 or items from which the service can select from to update the electronic content. In accordance with at least one embodiment, the content creator may also provide modification information associated with the set of items. The modification information may be utilized to modify an attribute associated with the set of phrases 414 or items. For example, the content creator may provide a list of colors to select from to modify the selected at least one item that eventually is incorporated into the updated content. In accordance with at least one embodiment, the service may determine the modifications of one or more attributes associated with a set of items, provided by the content creator, based on the user's profile information and the modification information provided by the content creator. The method 400 may determine a user profile and select at least one item of the plurality of items based at least in part on the determined user profile at 416. In accordance with at least one embodiment, the user profile may be determined based at least in part on user-initiated activity data and include information indicating a perceptual orientation of the user. For example, one or more service provider computers 404 may obtain user-initiated activity data of a user to determine the user profile and select at least one item based at least in part on the determined user profile. The user profile may indicate a perceptual orientation of a user in a perceptual spectrum as described in FIG. 3. The method 400 may include updating the electronic content to include the selected at least one item and provide the updated content to a user at 418. For example, the one or more service provider computers 404 may update the advertisement 406 to include one of the phrases 420 selected from the set of phrases 414 and provide the content to a user 422 via a user computing device 424.

Figure 5:
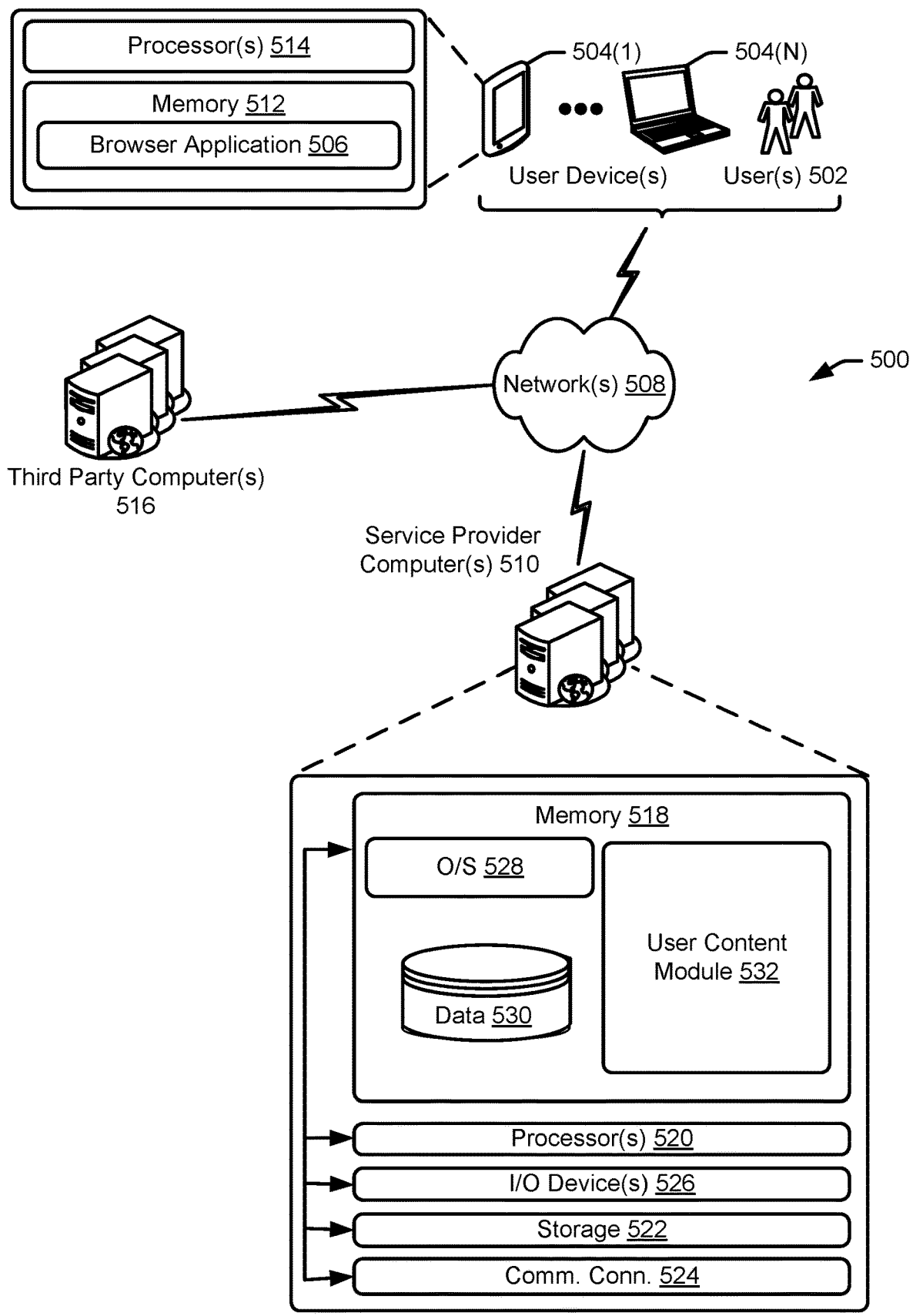
FIG. 5 illustrates an example architecture for a user specific content feature as described herein that includes one or more service provider computers and/or a user device connected via one or more networks, in accordance with at least one embodiment.

FIG. 5 illustrates an example architecture for a user specific content feature as described herein that includes one or more service provider computers and/or a user device connected via one or more networks, in accordance with at least one embodiment. In architecture 500, one or more users 502 may utilize user computing devices 504(1)-(N) (collectively, user devices 504) to access a browser application 506 (e.g., a web browser) or a user interface (UI) accessible through the browser application 506, via one or more networks 508. The "browser application" 506 can be any browser control or native application that can access and display a web page or other information. In some aspects, the browser application 506 may display the updated or revised content/advertisements, recommended items, or customized/changed detail item page described above. In some aspects, the browser application 506 may be hosted, managed, and/or provided by a computing resources service or service provider, such as by utilizing one or more service provider computers 510. The one or more service provider computers 510 may, in some examples, provide computing resources such as, but not limited to, client entities, low latency data storage, durable data storage, data access, management, virtualization, cloud-based software solutions, electronic content performance management, etc. The one or more service provider computers 510 may also be operable to provide web hosting, computer application development, and/or implementation platforms, combinations of the foregoing, or the like to the one or more users 502.

In one illustrative configuration, the user computing devices 504 may include at least one memory 512 and one or more processing units or processor(s) 514. The processor(s) 514 may be implemented as appropriate in hardware, computer-executable instructions, firmware, or combinations thereof. Computer-executable instruction or firmware implementations of the processor(s) 514 may include computer-executable or machine-executable instructions written in any suitable programming language to perform the various functions described. The user devices 504 may also include geo-location devices (e.g., a global positioning system (GPS) device or the like) for providing and/or recording geographic location information associated with the user devices 504.

The memory 512 may store program instructions that are loadable and executable on the processor(s) 514, as well as data generated during the execution of these programs. Depending on the configuration and type of user device 504, the memory 512 may be volatile (such as random access memory (RAM)) and/or non-volatile (such as read-only memory (ROM), flash memory, etc.). The user device 504 may also include additional removable storage and/or non-removable storage including, but not limited to, magnetic storage, optical disks, and/or tape storage. The disk drives and their associated computer-readable media may provide non-volatile storage of computer-readable instructions, data structures, program modules, and other data for the computing devices. In some implementations, the memory 512 may include multiple different types of memory, such as static random access memory (SRAM), dynamic random access memory (DRAM), or ROM.

Turning to the components of the memory 512 in more detail, the memory 512 may include an operating system and one or more application programs or services for implementing the features disclosed herein including providing updated or revised content to the user via the browser application 506 or dedicated applications (e.g., smart phone applications, tablet applications, etc.). The browser application 506 may be configured to receive, store, and/or display a website, and updated or revised advertisement/content, a recommend item, a customized item detail page, or other interface for interacting with the one or more service provider computers 510. Additionally, the memory 512 may store access credentials and/or other user information such as, but not limited to, user IDs, passwords, and/or other user information. In some examples, the user information may include information for authenticating an account such as, but not limited to, a device ID, a cookie, an IP address, a location, or the like. In addition, the user information may include a user 502 provided response to a security question or a geographic location obtained by the user device 504.

In some examples, the networks 508 may include any one or a combination of many different types of networks, such as cable networks, the Internet, wireless networks, cellular networks and other private and/or public networks. While the illustrated example represents the users 502 accessing the browser application 506 over the networks 508, the described techniques may equally apply in instances where the users 502 interact with the one or more service provider computers 510 via the one or more user devices 504 over a landline phone, via a kiosk, or in any other manner. It is also noted that the described techniques may apply in other client/server arrangements (e.g., set-top boxes, etc.), as well as in non-client/server arrangements (e.g., locally stored applications, etc.).

As described briefly above, the browser application 506 may allow the users 502 to interact with the one or more service provider computers 510, such as to access web content like web pages, updated or revised advertisements/content, recommended items, or customized detail pages. The one or more service provider computers 510, perhaps arranged in a cluster of servers or as a server farm, may host the browser application 506 and/or cloud-based software services. Other server architectures may also be used to host the browser application 506 and/or cloud-based software services. The browser application 506 may be capable of handling requests from many users 502 and serving, in response, various user interfaces that can be rendered at the user devices 504 such as, but not limited to, a website or web page. The browser application 506 can interact with any type of website that supports user interaction, including social networking sites, electronic retailers, informational sites, blog sites, search engine sites, news and entertainment sites, and so forth. The described techniques can similarly be implemented outside of the browser application 506, such as with other applications running on the user device 504.

The one or more service provider computers 510 may be any type of computing device such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 510 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment. In some examples, the one or more service provider computers 510 may be in communication with the user device 504 via the networks 508, or via other network connections. The one or more service provider computers 510 may include one or more servers, perhaps arranged in a cluster or as individual servers not associated with one another. The one or more service provider computers 510 may be in communication with one or more third party computers 516 via networks 508. The one or more service provider computers 510 that host the browser application 506 may obtain and provide data to third party computers 516 via networks 508 in accordance with embodiments described herein. The one or more third party computers 516 may be associated with the content creators.

In one illustrative configuration, the one or more service provider computers 510 may include at least one memory 518 and one or more processing units or processors(s) 520. The processor(s) 520 may be implemented as appropriate in hardware, computer-executable instructions, firmware, or combinations thereof. Computer-executable instruction or firmware implementations of the processor(s) 520 may include computer-executable or machine-executable instructions written in any suitable programming language to perform the various functions described. The memory 518 may store program instructions that are loadable and executable on the processor(s) 520, as well as data generated during the execution of these programs. Depending on the configuration and type of the one or more service provider computers 510, the memory 518 may be volatile (such as RAM) and/or non-volatile (such as ROM, flash memory, etc.). The one or more service provider computers 510 or servers may also include additional storage 522, which may include removable storage and/or non-removable storage. The additional storage 522 may include, but is not limited to, magnetic storage, optical disks and/or tape storage. The disk drives and their associated computer-readable media may provide non-volatile storage of computer-readable instructions, data structures, program modules, and other data for the computing devices. In some implementations, the memory 518 may include multiple different types of memory, such as SRAM, DRAM, or ROM.

The memory 518, the additional storage 522, both removable and non-removable, are all examples of computer-readable storage media. For example, computer-readable storage media may include volatile or non-volatile, removable or non-removable media implemented in any method or technology for storage of information such as computer-readable instructions, data structures, program modules, or other data. The memory 518 and the additional storage 522 are all examples of computer storage media. Additional types of computer storage media that may be present in the one or more service provider computers 510 may include, but are not limited to, PRAM, SRAM, DRAM, RAM, ROM, EEPROM, flash memory or other memory technology, CD-ROM, DVD or other optical storage, magnetic cassettes, magnetic tape, magnetic disk storage or other magnetic storage devices, or any other medium which can be used to store the desired information and which can be accessed by the one or more service provider computers 510. Combinations of any of the above should also be included within the scope of computer-readable media. Alternatively, computer-readable communication media may include computer-readable instructions, program modules, or other data transmitted within a data signal, such as a carrier wave, or other transmission. However, as used herein, computer-readable storage media does not include computer-readable communication media.

The one or more service provider computers 510 may also contain communication connection(s) 524 that allow the one or more service provider computers 510 to communicate with a stored database, another computing device or server, user terminals and/or other devices on the networks 508. The one or more service provider computers 510 may also include I/O device(s) 526, such as a keyboard, a mouse, a pen, a voice input device, a touch input device, a display, speakers, a printer, etc.

Turning to the contents of the memory 522 in more detail and as will be described in further detail in FIG. 6, the memory 518 may include an operating system 528, one or more data stores 530, and/or one or more application programs or services for implementing the features disclosed herein including a user content module 532. In accordance with at least one embodiment, the user content module 532 may be configured to obtain user-initiated activity data, determine a user profile based at least in part on the user-initiated activity data, receive content configured to be revised with user content associated with a user from a content creator, updated the content to include a data object that is determined based at least in part on the user profile and/or the user-initiated activity data, and provide the updated content that includes at least the data object for selection or presentation.

Figure 6:
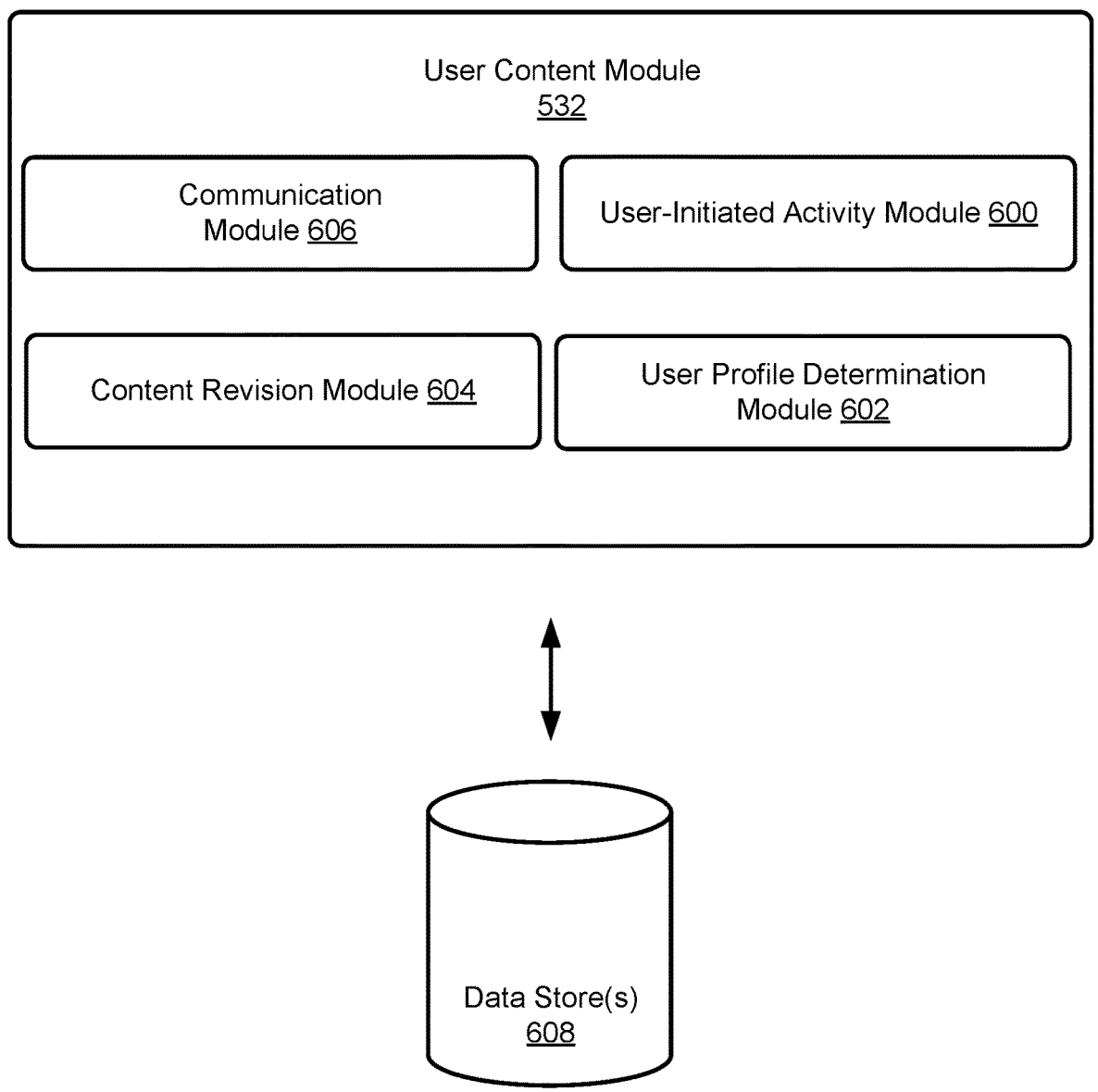
FIG. 6 illustrates a schematic diagram depicting aspects of an example user content module and associated data stores in accordance with at least one embodiment.

FIG. 6 illustrates a schematic diagram depicting aspects of an example user content module and associated data stores in accordance with at least one embodiment. It should be noted that while multiple modules are described in the example user content module 532, the processes and methods described herein can be performed by more or less modules within memory such as memory 518 described above. In addition, while the modules 600-600 included in user content module 532 are displayed and described as distinct modules, in some embodiments they may be included within one another to further facilitate methods and systems described herein. Also, it should be noted that the described processes and architectures described below can be performed either in real-time or in an offline mode prior to any user-initiated web activity. In accordance with at least one embodiment, the user content module 532 may include a user-initiated activity module 600, a user profile determination module 602, a content revision module 604, and a communication module 606, in communication with one or more data stores 608 (which is an example of the one or more data stores 530 from FIG. 5).

In an embodiment, the user-initiated activity module 600 may communicate and obtain or receive data from a social network source or electronic marketplace source associated with a user via the networks 508 from third party computers 516. The user-initiated activity module 600 may obtain or receive clickstream data associated with a user interacting with an advertisement, recommended item, or customized/changed/updated detail page associated with an electronic marketplace. Further, the user-initiated activity module 600 may be responsible for parsing or extracting from the data received or obtained from the social network source metrics or features which can be communicated to the user profile determination module 602. In some examples, the user-initiated activity module 600 may receive or obtain user data associated with a social network source via the communication module 606. The communication of said data can be via the networks 508 and the data source can be from the one or more third party computers 516 associated with a social networking source. The communication module 606 may also communicate the parsed or extracted data to the user profile determination module 602 for the machine learning algorithm to utilize and determine a user profile. The communication module 606 may also communicate the parsed or extracted data to the user content module 532 to determine a set of phrases or object associated with the user for inclusion in content configured to be updated. In accordance with at least one embodiment, the user-initiated activity module 600 may obtain the geographic location information of a user. The geographic location information of a user may be utilized in conjunction with a set of phrases maintained by the service to generate an object or phrase to update content. In accordance with at least one embodiment, the geographic location information may be an additional data point to aid in generating the data object or phrase to update content with. In accordance with at least one embodiment, the user content module 532 may utilize the obtained metadata and user-initiated activity data to generate a set of phrases for a particular user. The set of phrases may be maintained by the service and stored in the one or more data stores 608. One or more phrase of the set of phrases may then be used to generate a data object for use in updating content from a content creator for the particular user. In accordance with at least one embodiment, a content creator can request the set of phrases, as determined by the service, for use in generating advertisements or content specific to a particular user. The set of phrases may dynamically be updated based at least in part on the user-initiated activity data. In accordance with at least one embodiment, the service may provide a snap shot at periodic times of the set of phrases to a content creator for use in generating content.

In accordance with at least one embodiment, the user profile determination module 604 may communicate with the user-initiated activity module 600 to obtain or receive a plurality of data metrics for a user. The obtained or received data metrics may then be utilized by a machine learning algorithm to determine a user's profile. The user's profile may contain information which identifies the user within a perceptual spectrum thus inferring their perceptual orientation for a plurality of perceptual orientations. In some embodiments the user profile may include information which indicates whether the user is visually or textually oriented, or any orientation that may be determined as described herein. Once a user's profile has been determined it may be communicated to the user content module 532 for generation of a phrase or data object that will be included in an updated or revised advertisement/user content. As described above, a user's profile may change dynamically according to the data obtained or received and utilized by the machine learning algorithm.

In accordance with at least one embodiment, the user content module 532 may communicate with the user-initiated activity module 600 and the content revision module 604 to generate a data object for inclusion in content configured to be updated. In accordance with at least one embodiment, the user content module 532 may communicate with the user-initiated activity module 600, the user profile determination module 602, and the content revision module 604 to generate a data object for inclusion in content configured to be updated. The user content module 532 may generate the data object based at least in part on the user-initiated activity data of a user and/or a user's profile. In accordance with at least one embodiment, the user content module 532 may interact with the communication module 606 to select an item from a plurality of items provided by a content creator to include in content configured to be updated. The user content module 532 may select the item for inclusion based at least in part on the user-initiated activity data and/or a user's profile. In accordance with at least one embodiment, the user content module 532 in conjunction with the user-initiated activity module 600 determine phrases or objects unique to a user and their meaning given the context that the phrases or objects are used in a user's social networking service. In accordance with at least one embodiment, the user content module can include the determined phrases or objects from a user's social networking service that are unique to that user for inclusion in content configured to be updated. In accordance with at least one embodiment, and as described above, the data object or user content can include audio data objects, video data objects, and image data objects.

In accordance with at least one embodiment, the content revision module 604 may communicate with the user content module 532 to update or revise content or an advertisement provided by a content creator. In accordance with at least one embodiment, the content revision module 604 may update or revise content or an advertisement by at least including the generated data object or phrase from the user content module 532. In accordance with at least one embodiment, the content revision module 604 may utilize the user's profile and/or user-initiated activity of the user to modify or remove portions of content in addition to or instead of including a data object or phrase. For example, the content revision module 604 may determine based at least in part on the user profile information and/or user-initiated activity data of a particular user that they are familiar with the item included in an advertisement provided by a content creator. As such, the content revision module 604 may remove portions of the advertisement to better appeal and gain the interest of the particular user based at least in part on the user's profile and/or user-initiated activity data. In accordance with at least one embodiment, the content creator may provide a set of policies or policy information to the service via the communication module 606. In some embodiments, the content revision module 604 may revise or update content based at least in part on the generated data object and the set of policies or policy information from the content creator. In accordance with at least one embodiment, the content revision module 604 may modify or remove portions of the content in addition to including the data object only so much as is allowed by the policy information or set of policies provided by the content creator.

In other embodiments, the content revision module 604 can also select or generate a customized detail page for an item based at least in part on the user's profile and/or user-initiated activity data. In accordance with at least one embodiment, the updated content may be communicated or provided, via the communication module 606, to the browser of a user utilizing for example the networks 508 and browser application 506. In accordance with at least one embodiment, the communication module 606 may provide the updated content to the content creator for selection and presentation to a user. In accordance with at least one embodiment, the user content module 532 may provide a plurality of phrases or objects for inclusion in updated content by the content revision module 604. The content revision module 604 and the communication module 606 may provide a set of updated content to the content creator for selection and presentation to a user.

Figure 7:
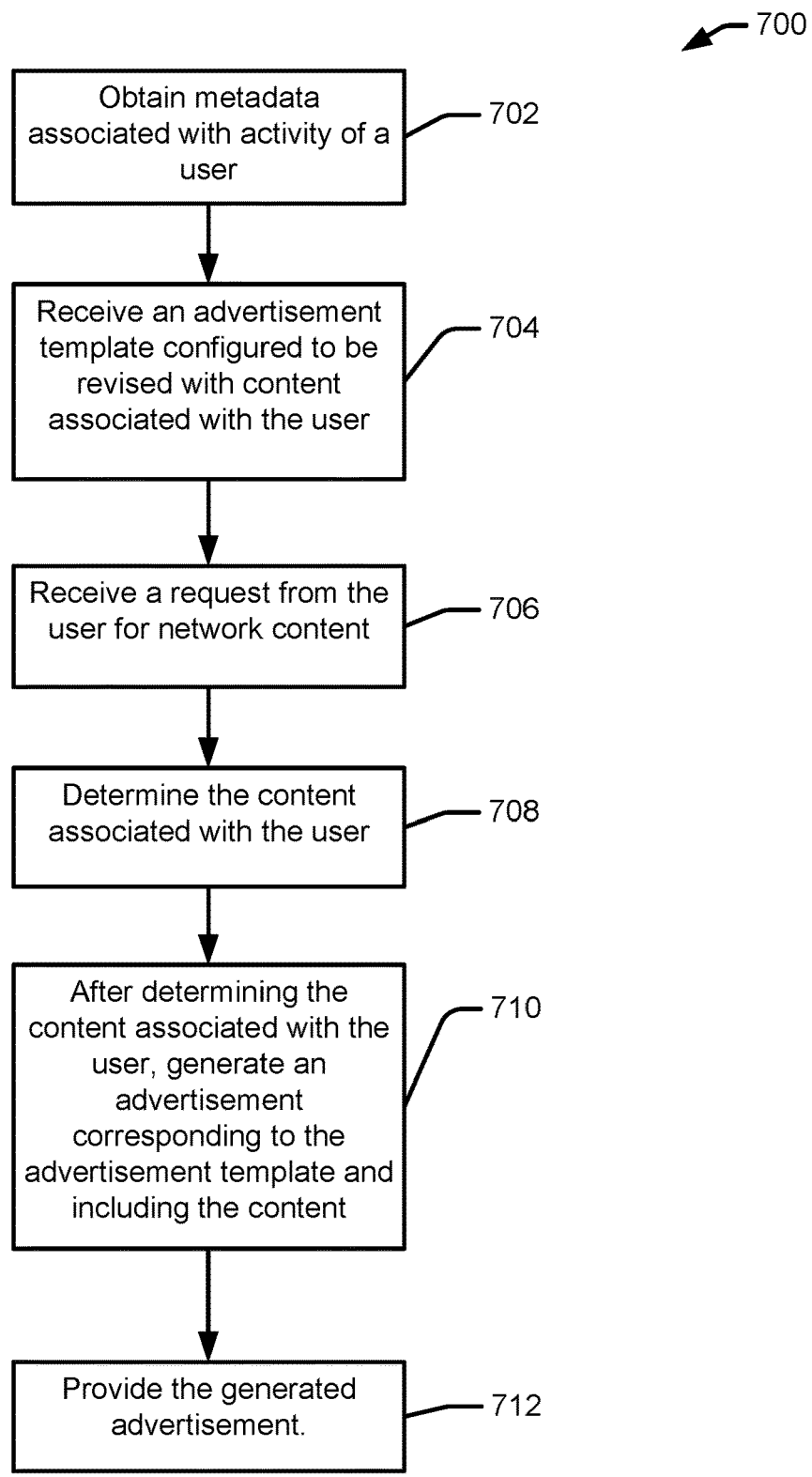
FIG. 7 illustrates a flow diagram of a process for a user specific content feature as described herein, in accordance with at least one embodiment.
Figure 8:
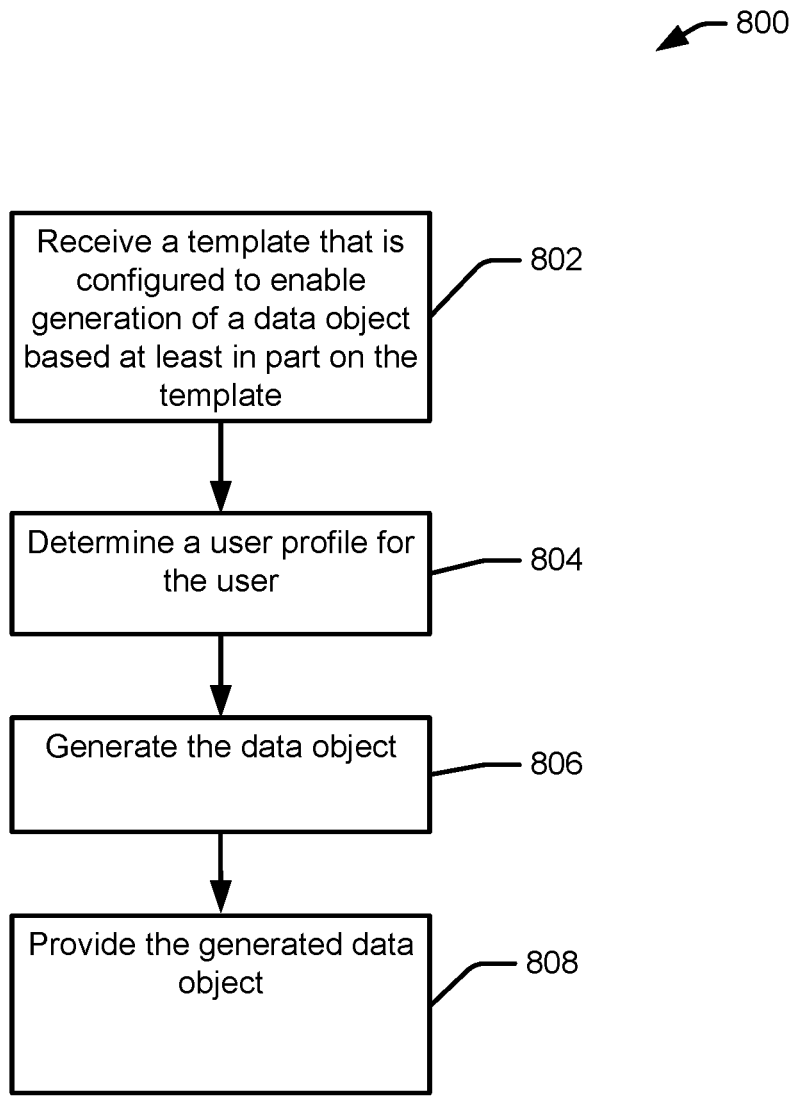
FIG. 8 illustrates a flow diagram of a process for a user specific content feature as described herein, in accordance with at least one embodiment.

FIGS. 7 and 8 illustrate example flow diagrams showing respective processes 700 and 800 for providing user specific content to a user. These processes are illustrated as logical flow diagrams, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer executable instructions include routines, programs, objects, components, data structures and the like that perform particular functions or implement particular data types. The order in which the operations are described is not intended to be construed as a limitation, and any number of the described operations can be combined in any order and/or in parallel to implement the processes.

Additionally, some, any, or all of the processes (or any other processes described herein, or variations and/or combinations thereof) may be performed under the control of one or more computer systems configured with executable instructions and may be implemented as code (e.g., executable instructions, one or more computer programs or one or more applications) executing collectively on one or more processors, by hardware or combinations thereof. As noted above, the code may be stored on a computer-readable storage medium, for example, in the form of a computer program comprising a plurality of instructions executable by one or more processors. The computer-readable storage medium may be non-transitory.

In some examples, the one or more service provider computers 510 (e.g., utilizing at least one of the user content module 532, the user-initiated activity module 600, the user profile determination module 602, the content revision module 604, and the communication module 606 in communication with one or more data stores 608) shown in FIGS. 5 and 6, may perform the process 700 of FIG. 7. In FIG. 7 the process 700 may include obtaining metadata associated with activity of a user. In accordance with at least one embodiment, the activity of the user may correspond to activity on at least one of a social networking service or an electronic marketplace. At 704, the process 700 may include receiving an advertisement template configured to be revised with content associated with the user. In accordance with at least one embodiment, the advertisement template may be provided by a content creator and include a placeholder for the content associated with the user. In some examples, the content associated with the user can include a phrase or data object.

At 706, the process 700 may include receiving a request from the user for network content. For example, a user's web browser application (FIG. 5) may indicate to the service a provision of content to be presented to the user. In accordance with at least one embodiment, content creators may provide a request for content to be provided to a user. At 708, the process 700 can include determining the content associated with the user. In accordance with at least one embodiment, the content associated with the user may be determined based at least in part on the metadata associated with the activity of the user. In some examples, the content associated with the user may be determined based at least in part on a user profile. The user profile may be associated with information indicating a region in a perceptual spectrum of perceptual orientations as described above. The user profile may be determined based at least in part on a machine learning algorithm that uses the obtained metadata from operation 702. At 710, the process 700 can include generating an advertisement corresponding to the advertisement template after determining the content associated with the user. In accordance with at least one embodiment, generating the advertisement can include incorporating the content associated with the user at the placeholder of the advertisement template. The process 700 may conclude at 712 by providing the generated advertisement. In accordance with at least one embodiment, the generated advertisement may be provided to the user, or the content creator for at least one of selection or presentation to the user.

FIG. 8 illustrates a flow diagram of a process for a user specific content feature as described herein, in accordance with at least one embodiment. In some examples, the one or more service provider computers 510 (e.g., utilizing at least one of the user content module 532, the user-initiated activity module 600, the user profile determination module 602, the content revision module 604, and the communication module 606 in communication with one or more data stores 608) shown in FIGS. 5 and 6, may perform the process 800 of FIG. 8. In FIG. 8 the process 800 may include receiving a template that is configured to enable generation of a data object based at least in part on the template. At 804, the process 800 can include determining a user profile for the user. In accordance with at least one embodiment, the user profile can be determined based at least in part on user-initiated activity data and include information indicating a perceptual orientation of the user.

At 806, the process 800 can include generating the data object. In accordance with at least one embodiment, the data object can be associated with a perceptual orientation of the user. In accordance with at least one embodiment, the data object is generated based at least in part on the determined user profile and the received template. As described above, the service may determine the user profile from the obtained user-initiated activity data. The process 800 can conclude at 808 by providing the generated data object. In accordance with at least one embodiment, the generated data object may be provided to the content creator for selection and presentation to a user or the generated data object may be directly provided to the user by the service.

Figure 9:
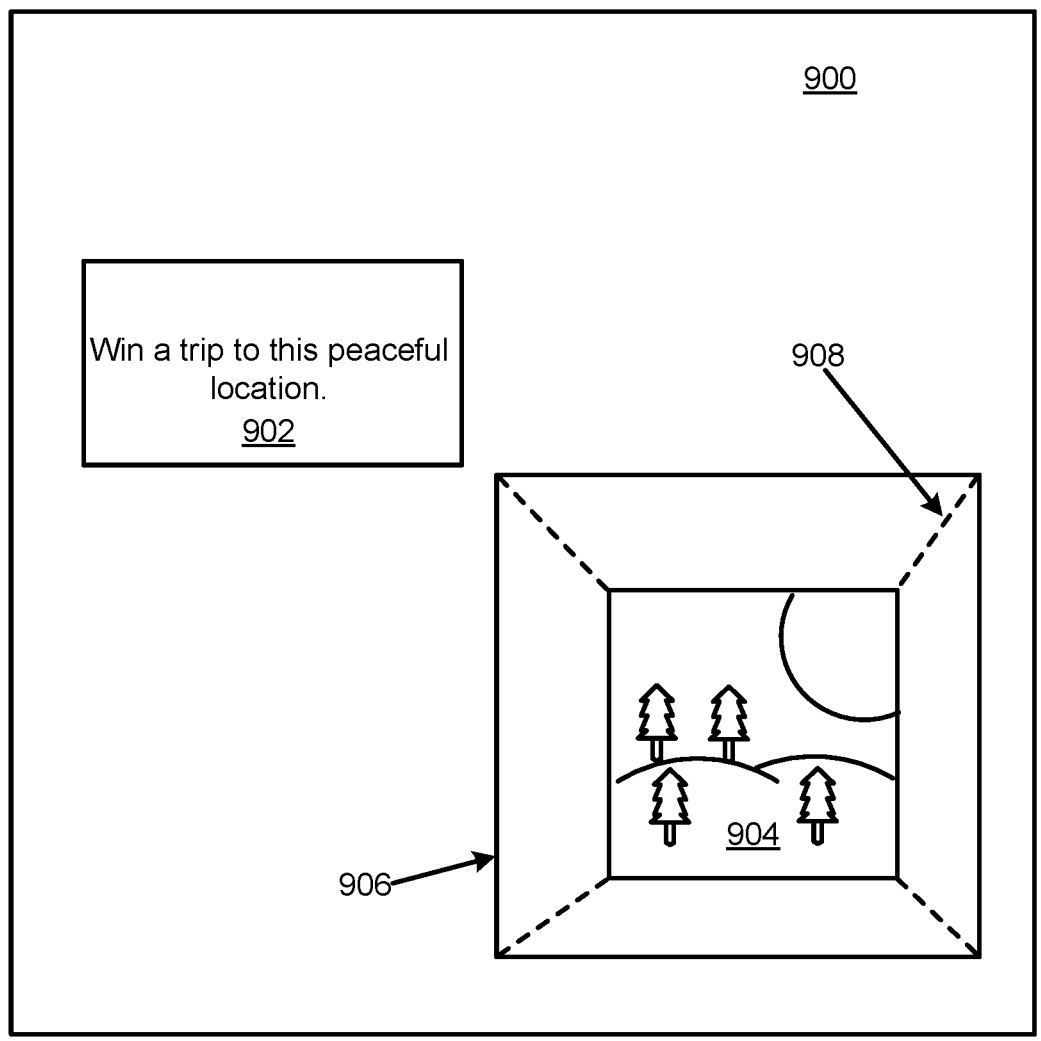
FIG. 9 illustrates an example template advertisement with modifiable parameters for a user specific content feature as described herein, in accordance with at least one embodiment.

FIG. 9 illustrates an example template advertisement with modifiable parameters for a user specific content feature as described herein, in accordance with at least one embodiment. FIG. 9 includes an example template advertisement 900 which may be provided by a content creator for revision by the service to provide user specific content to a user. Included in the template advertisement is text 902 associated with the advertisement and an image object 904 that may be generated based on a user's profile as described above for revising the template advertisement 900. The image object 904 in FIG. 9 can correspond to the peaceful location indicated in the text 902. In accordance with at least one embodiment, the template advertisement may include modifiable parameters, as described above, that can be utilized by the service to modify a parameter associated with template advertisement, or the generated object for inclusion in the revised advertisement. FIG. 9 includes an example maximum parameter 906 for modifying the size or location of the image object 904, and a range 908 of modifications that could be made to the size or location of the image object 904. In accordance with at least one embodiment, the service may generate a data object, such as image object 904 for revising a template advertisement 900 and further modify the data object based on the parameters associated with the template advertisement 900. In accordance with at least one embodiment, the content provider may provide modification information, such as a selection of a color scheme, for further modifying the generated data object. The service may select a particular modification included in the modification information based at least in part on the user's profile and then modify the generated data object. The modified generated data object may then be utilized to revise the template advertisement, such as template advertisement 900.

Figure 10:
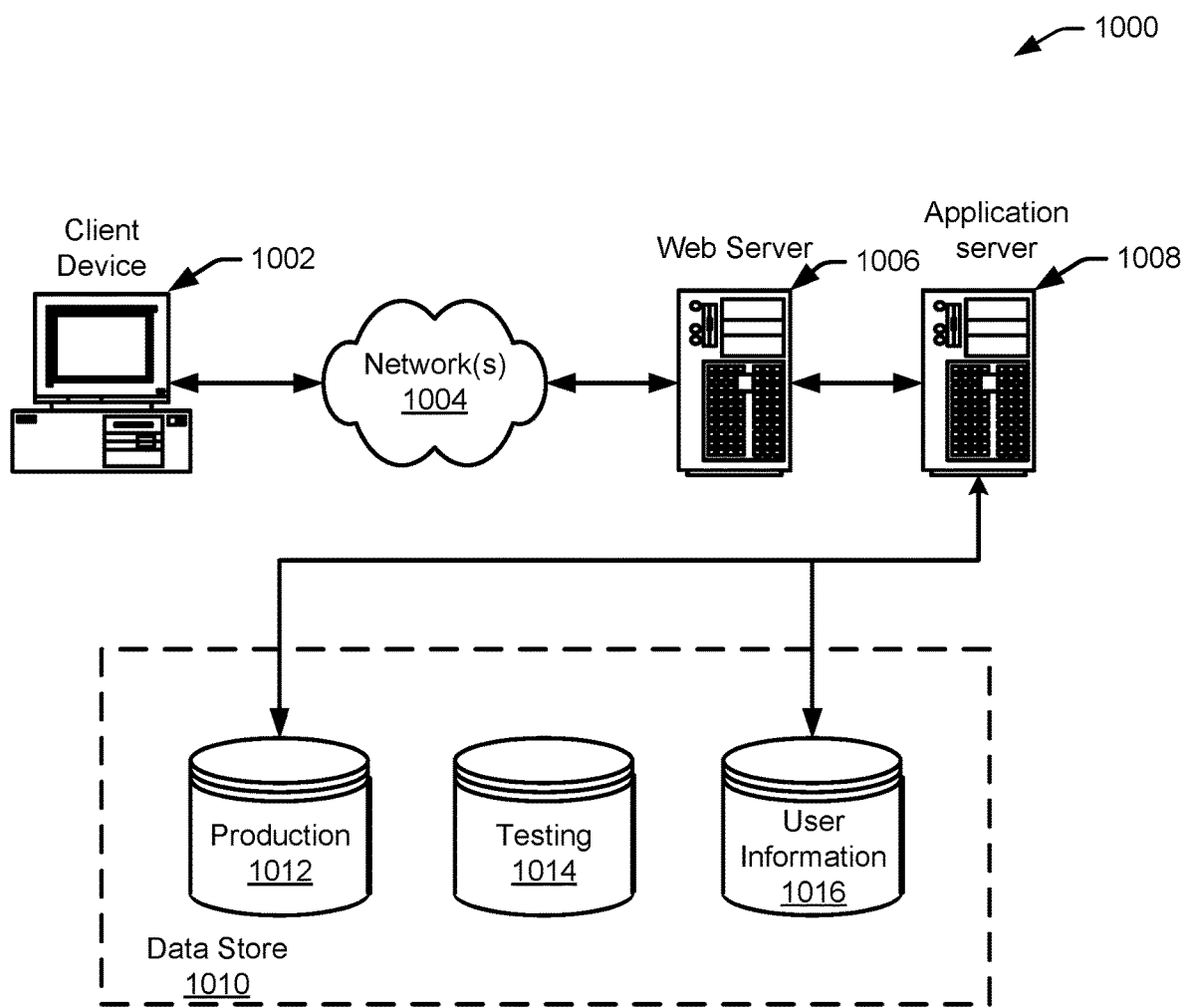
FIG. 10 illustrates an environment in which various embodiments of the social network analysis and user profile determination can be implemented in accordance with at least one embodiment.

FIG. 10 illustrates aspects of an example environment 1000 for implementing aspects in accordance with various embodiments. As will be appreciated, although a Web-based environment is used for purposes of explanation, different environments may be used, as appropriate, to implement various embodiments. The environment includes an electronic client device 1002, which can include any appropriate device operable to send and receive requests, messages, or information over an appropriate network 1004 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 1006 for receiving requests and serving content in response thereto, although for other networks an alternative device serving a similar purpose could be used as would be apparent to one of ordinary skill in the art.

The illustrative environment includes at least one application server 1008 and a data store 1010. It should be understood that there can be several application servers, layers, or other elements, processes or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices and data storage media, in any standard, distributed or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio and/or video to be transferred to the user, which may be served to the user by the Web server in the form of HyperText Markup Language ("HTML"), Extensible Markup Language ("XML") or another appropriate structured language in this example. The handling of all requests and responses, as well as the delivery of content between the client device 1002 and the application server 1008, can be handled by the Web server. It should be understood that the Web and application servers are not required and are merely example components, as structured code discussed herein can be executed on any appropriate device or host machine as discussed elsewhere herein.

The data store 1010 can include several separate data tables, databases or other data storage mechanisms and media for storing data relating to a particular aspect. For example, the data store illustrated includes mechanisms for storing production data 1012 and user information 1016, which can be used to serve content for the production side. The data store also is shown to include a mechanism for storing log data 1014, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 1010. The data store 1010 is operable, through logic associated therewith, to receive instructions from the application server 1008 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 1002. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions. Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 10. Thus, the depiction of the system 1000 in FIG. 10 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS") and AppleTalk. The network can be, for example, a local area network, a wide-area network, a virtual private network, the Internet, an intranet, an extranet, a public switched telephone network, an infrared network, a wireless network, and/or any combination thereof.

In embodiments utilizing a Web server, the Web server can run any of a variety of server or mid-tier applications, including Hypertext Transfer Protocol ("HTTP") servers, FTP servers, Common Gateway Interface ("CGP") servers, data servers, Java servers and business application servers. The server(s) also may be capable of executing programs or scripts in response requests from user devices, such as by executing one or more Web applications that may be implemented as one or more scripts or programs written in any programming language, such as Java®, C, C # or C++, or any scripting language, such as Perl, Python or TCL, as well as combinations thereof. The server(s) may also include database servers, including without limitation those commercially available from Oracle®, Microsoft®, Sybase® and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen or keypad) and at least one output device (e.g., a display device, printer or speaker). Such a system may also include one or more storage devices, such as disk drives, optical storage devices and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired), an infrared communication device, etc.) and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets) or both. Further, connection to other computing devices such as network input/output devices may be employed.

Storage media and computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules or other data, including RAM, ROM, Electrically Erasable Programmable Read-Only Memory ("EEPROM"), flash memory or other memory technology, Compact Disc Read-Only Memory ("CD-ROM"), digital versatile disk (DVD) or other optical storage, magnetic cassettes, magnetic tape, magnetic disk storage or other magnetic storage devices or any other medium which can be used to store the desired information and which can be accessed by the a system device. Based at least in part on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving, by a computing system, a template that is configured to enable generation of a data object based at least in part on the template;
   determining a user profile for a user, the user profile determined based at least in part on user-initiated activity data and including information indicating a location within one or more perceptual spectrums that define a range of one or more perceptual orientation types, the location within the one or more perceptual spectrums corresponding to a perceptual orientation of the user, the location identified based at least in part on the user-initiated activity data;
   generating, by the computing system, the data object associated with the perceptual orientation of the user based at least in part on the determined user profile, the user-initiated activity data, and the received template;
   providing the generated data object;
   determining an image or text associated with the user based at least in part on the user-initiated activity data; and
   updating the data object to at least include the image or the text.

2. The computer-implemented method of claim 1, further comprising:
   receiving a specification associated with the template, the specification including modification information utilized to revise the data object, the modification information indicating allowances or restrictions to a modifiable parameter of the data object; and
   revising the data object based at least in part on the specification and the template.

3. The computer-implemented method of claim 2, wherein revising the data object based at least in part on the specification and the template includes modifying the data object in accordance with the modification information for the modifiable parameter.

4. The computer-implemented method of claim 1, wherein providing the generated data object includes providing the data object to a content creator or the user.

5. The computer-implemented method of claim 1, wherein the user profile is updated based at least in part on feedback information obtained from the user-initiated activity data.

6. A system, comprising:
   at least one processor; and
   memory including computer-executable instructions that, when executed by the at least one processor, cause the system to at least:
      receive a template that is configured to enable generation of a data object based at least in part on the template;
      determine a user profile for a user based at least in part on user-initiated activity data and including information indicating a location within one or more perceptual spectrums that define a range of one or more perceptual orientation types, the location within the one or more perceptual spectrums corresponding to a perceptual orientation of the user, the location identified based at least in part on the user-initiated activity data;
      generate the data object associated with the perceptual orientation of the user based at least in part on the determined user profile and the received template, the received template modified by removing portions of the template based at least in part on the user-initiated activity;
      transmit the generated data object to a computer system;
      determine an image or text associated with the user based at least in part on the user-initiated activity data; and
      update the data object to at least include the image or the text.

7. The system of claim 6, wherein the at least one processor further causing the system to at least:
   receive a specification associated with the template, the specification including modification information utilized to revise the data object, the modification information indicating allowances or restrictions to a modifiable parameter of the data object; and
   revise the data object based at least in part on the specification and the template.

8. The system of claim 7, wherein revising the data object based at least in part on the specification and the template includes modifying the data object in accordance with the modification information for the modifiable parameter.

9. The system of claim 6, wherein transmitting the generated data object to the computer system includes providing the data object to a content creator associated with the computer system.

10. The system of claim 6, wherein the user profile is updated based at least in part on feedback information obtained from the user-initiated activity data.

11. The system of claim 6, wherein the at least one processor further causing the system to at least:
    receive a plurality of policies from a content creator; and
    generate the data object further based at least in part on the plurality of policies.

12. The system of claim 11, wherein the plurality of policies indicate a threshold level of information to be included in the data object.

13. A non-transitory computer readable medium storing specific computer-executable instructions that, when executed by a processor, cause a computer system to at least:

receive a template that is configured to enable generation of a data object based at least in part on input that is utilized to modify the template;

determine a user profile for a user based at least in part on user-initiated activity data and including information indicating a location within one or more perceptual spectrums that define a range of one or more perceptual orientation types, the location within the one or more perceptual spectrums corresponding to a perceptual orientation of the user, the location identified based at least in part on the user-initiated activity data;

generate the data object associated with the perceptual orientation of the user based at least in part on the determined user profile and the received template, the received template modified by removing portions of the template based at least in part on the user-initiated activity;

transmit the generated data object to a computer system;

determine an image or text associated with the user based at least in part on the user-initiated activity data; and update the data object to at least include the image or the text.

* * * * *